United States Patent [19]

Shiraki et al.

[11] Patent Number: 4,876,472
[45] Date of Patent: Oct. 24, 1989

[54] FIVE-PHASE DC MOTOR WITH NON-OVERLAPPING ARMATURE WINDINGS

[75] Inventors: Manabu Shiraki; Norimitsu Hirano, both of Kanagawa, Japan

[73] Assignees: Shicoh Engineering Co., Ltd., Kanagawa, Japan; M. Gottlieb Assoc., Chicago, Ill.

[21] Appl. No.: 198,747

[22] Filed: May 25, 1988

[30] Foreign Application Priority Data

Sep. 30, 1987 [JP] Japan .................. 62-243577

[51] Int. Cl.⁴ .............................................. H02K 23/26
[52] U.S. Cl. ................................. 310/198; 310/154; 310/234; 29/598
[58] Field of Search ............... 310/177, 152, 154, 233, 310/234, 248, 202, 198–207, 195, 216, 218, 254, 261, 264, 265, 269, 42; 29/597, 598

[56] References Cited

U.S. PATENT DOCUMENTS

| | | | |
|---|---|---|---|
| 4,132,914 | 1/1979 | Khutoretsky | 310/205 |
| 4,227,107 | 10/1980 | Ban | 310/46 |
| 4,404,485 | 9/1983 | Ban | 310/234 |
| 4,437,029 | 3/1984 | Ban | 310/154 |
| 4,532,449 | 7/1985 | Aoki | 310/234 |
| 4,583,016 | 4/1986 | Ban | 310/198 |

FOREIGN PATENT DOCUMENTS 0027505 3/1977 Japan ............................ 310/234

Primary Examiner—R. Skudy
Attorney, Agent, or Firm—Wegner & Bretschneider

[57] ABSTRACT

A 5-phase dc motor which can be mass-produced readily at a reduced cost. The motor comprises a field magnet having four alternate north and south magnetic poles of an equal angular width, a rotor including a rotor armature core having five rotor pole shoes formed in an angularly equidistantly spaced relationship by an electrical angle of 144 degrees, a commutator including ten commutator segments provided successively on the rotor, and a pair of brushes disposed in a spaced relationship by an angular distance of 180° electrical and for sliding contact with the commutator. A single conductor is electrically connected to the commutator segments and wound on the rotor pole shoes in a predetermined specific sequence to form armature windings which do not overlap with any other armature windings.

4 Claims, 14 Drawing Sheets

FIVE-PHASE DC MOTOR WITH NON-OVERLAPPING ARMATURE WINDINGS

BACKGROUND OF THE INVENTION

1. Field of the Invention

This invention relates to 5-phase dc motor of the type having a stator which includes a field magnet having four magnetic poles, a rotor having five rotor poles shoes, five armature windings for first to fifth phases wound on the rotor pole shoes, a commutator including ten commutator segments, and a pair of brushes disposed in an angularly spaced relationship by an angle of 90 degrees in mechanical angle (180 degrees in electrical angle).

2. Description of the Prior Art

A 3-phase dc motor wherein an armature winding is wound on each of three rotor pole shoes of a rotor is already known as an inexpensive small dc motor.

A 3-phase dc motor of the rotor pole shoe type includes a stator in the form of an annular field magnet having two north and south magnetic poles or pole zones having an angular width of 180° mechanical (180° electrical), three armature windings wound on three rotor pole shoes of a rotor which is formed from layered silicon steel plates and mounted for rotation in an opposing relationship to the field magnet with an air gap left therebetween, a commutator having three commutator segments, and two brushes arranged with an angular width of 180° mechanical (also 180° electrical) for slidably contacting with the commutator, whereby electric current is supplied via a positive terminal and a negative terminal of a dc power source.

Since the commutator in the 3-phase dc motor is formed from three commutator segments, the current is changed over only six times for one full rotation of the commutator. Accordingly, torque ripples become so large that the 3-phase dc motor cannot rotate smoothly. The 3-phase dc motor is therefore unsuited for appliances for which torque ripples are required to be as low as possible in magnitude.

Further, since the angular width of each rotor pole shoe is considerably small comparing with the angular width of each magnetic pole or pole zone of the field magnet, the effective portion of each rotor pole shoe which contributes to generation of torque has a considerably small extent comparing with the angular width of each magnetic pole of the field magnet. This results in generation of a counter torque, and accordingly the 3-phase dc motor cannot generate a high torque and is very low in efficiency.

While it is almost impossible to reduce the magnitude of torque ripples to zero in a dc motor of the rotor pole shoe type, one of measures to reduce torque ripples in magnitude at a lowest cost is to increase the change-over frequency of a current and also to increase the frequency of torque ripples on the thus-increased frequency of the current, to make torque ripples as flat as possible.

There has been a demand for a high-efficiency dc motor which can reduce torque ripples and moreover produce a still larger torque without need for extreme changes to the size of the motor.

For this purpose, such as 5-phase dc motor of the rotor pole shoe type as shown in FIGS. 6 to 9 has conventionally been provided which partly eliminates the drawbacks of the 3-phase dc motor described above. The conventional 5-phase dc motor 1 includes a rotor armature 2 composed of a rotor armature core 3 and five armature windings 5 wound in an overlapping relationship on five rotor pole shoes 4 of the rotor armature core 3.

Referring to FIG. 6, the rotor armature core 3 has the five rotor pole shoes 4-1, 4-2, . . . , and 4-5 formed in an equidistantly spaced relationship therein so that up to five winding receiving slots 6 are defined between the rotor pole shoes 4. The five armature windings 5-1, 5-2, . . . , and 5-5 are received in an equidistantly spaced relationship in the five slots 6 such that they may overlap with the other armature windings 5 at axial conductor end portions 7 thereof.

It is to be noted that, in FIGS. 6 and 7, portions of the armature windings received in the slots 6 (portions indicated by broken lines 8-1, 8-2, . . . , and 8-10 in FIG. 6) contribute to generation of torque while the other portions of the armature windings, that is, conductor end portions 7 projected from the opposite axial ends of the rotor pole shoes 4 do not contribute to generation of torque.

The five armature windings 5-1 to 5-5 for the first to fifth phases may be inserted into the five slots 6-1, 6-2, . . . , and 6-5, for example, by following steps.

At first, one of a pair of conductor portions of the armature winding 5-1 for the first phase, which contribute to generation of torque, is inserted to the location 8-1 as indicated by a broken line in the slot 6-1 between the rotor pole shoes 4-5 and 4-1, and then the other conductor portion, which contributes to generation of torque, is inserted to the location 8-4 indicated by a broken line in the slot 6-3 between the rotor pole shoes 4-2 and 4-3.

One of a pair of conductor portions of the armature winding 5-2 for the second phase, which contribute to generation of torque, is then inserted to the location 8-3 as indicated by a broken line in the slot 6-2 between the rotor pole shoes 4-1 and 4-2, and then the other conductor portion, which contributes to generation of torque, is inserted to the location 8-6 indicated by a broken line in the slot 6-4 between the rotor pole shoes 4-3 and 4-4.

One of a pair of conductor portions of the armature winding 5-3 for the third phase, which contribute to generation of torque, is subsequently inserted to the location 8-5 as indicated by a broken line in the slot 6-3 between the rotor pole shoes 4-2 and a 4-3, and then the other conductor portion, which contributes to generation of torque, is inserted to the location 8-8 indicated by a broken line in the slot 6-5 between the rotor pole shoes 4-4 and 4-5.

After then, one of a pair of conductor portions of the armature winding 5-4 for the fourth phase, which contribute to generation of torque, is inserted to the location 8-7 as indicated by a broken line in the slot 6-4 between the rotor pole shoes 4-3 and 4-4, and then the other conductor portion, which contributes to generation of torque, is inserted to the location 8-10 indicated by a broken line of the slot 6-1 between the rotor pole shoes 4-5 and 4-1.

Finally, one of a pair of conductor portions of the armature winding 5-5 for the fifth phase which contribute to generation of torque is inserted to the location 8-9 indicated by a broken line in the slot 6-5 between the rotor pole shoes 4-4 and 4-5, and then the other conductor portion which contributes to generation of torque is inserted to the location 8-2 indicated by a broken line in the slot 6-2 between the rotor pole shoes 4-1 and 4-2.

In this manner, the armature wirings 5-1 to 5-5 for the first to fifth phases can be mounted in position on the rotor armature core 3 as shown in FIGS. 7 and 8.

Since the dc motor 1 includes the five armature windings 5, it includes a commutator 9 which is composed of five commutator segments 9-1, 9-2, . . . , and 9-5 arranged in a concentrical relationship to a rotary shaft 10.

An annular field magnet 11 is secured in an opposing relationship to an outer periphery of the rotor armature 2 with a radial air gap left therebetween. The field magnet 11 has two north and south magnetic poles having an angular width of 180 degrees. A motor body not shown made of a magnetic material for closing a magnetic path is secured on an outer periphery of the field magnet 11.

A pair of brushes 12-1 and 12-2 are provided for sliding contact with the commutator 9. As seen in FIG. 9 which is a developed view of the field magnet 11 and the armature windings 5-1 to 5-5, the brushes 12-1 and 12-2 are disposed in an angularly spaced relationship by an angle of 180° mechanical (also 180° electrical) similarly as in the 3-phase dc motor described above. The brushes 12-1 and 12-2 supply electric current from a positive power source terminal 13-1 and a negative power source terminal 13-2 to the armature windings 5-1 to 5-5 by way of the commutator 9.

The armature windings 5-1 to 5-5 are wound on the rotor pole shoes 4 at equal intervals such that the conductor end portions 7 of each adjacent ones of the armature windings 5 overlap with each other.

The commutator 9 includes the five commutator segments 9-1 to 9-5 as described above, and one of pairs of terminals of the armature windings 5-1 to 5-5 are electrically connected to the commutator segments 9-1 to 9-5, respectively, while the other terminals of the armature windings 5-1 to 5-5 are electrically connected to the commutator segments 9-2, 9-3, 9-4, 9-5, and 9-1, respectively.

The 5-phase dc motor 1 of the five rotor pole shoe type is constructed in this manner.

With the 5-phase dc motor 1, electric current is changed over by 10 times during one full rotation of the commutator 9. This therefore increases the frequency of torque ripples by four times for one full rotation of the commutator 9 comparing with the 3-phase dc motor of the three rotor pole shoe type, whereby the 5-phase dc motor is allowed to make smoother rotation owing to the four-fold frequency of torque ripples.

The 5-phase dc motor 1 is further advantageous in that it generates a higher torque because it includes a greater number of armature windings comparing with the 3-phase dc motor and the five armature windings 5 are successively changed over for energization.

The 5-phase dc motor 1 having the 2-pole field magnet 11 and the commutator 9, which includes the five rotor pole shoes 4-1 to 4-5, the five windings 5-1 to 5-5, and the five commutator segments 9-1 to 9-5, is advantageous indeed in that torque ripples can be minimized in magnitude comparing with a conventional 3-phase dc motor.

However, the 5-phase dc motor 1 of such a construction as described above is still great in magnitude of torque ripples and is not satisfactory as a dc motor for use with an appliance, which is very sensitive to high torque ripples, such as sound appliances because the commutator 9 includes the five commutator segments 9-1 to 9-5.

Besides, since the armature windings 5-1 to 5-5 wound on the rotor pole shoes 4 and constituting the individual phases overlap with the other armature windings in several layers at the conductor end portions 7 thereof over a very large angular range, the thickness of the conductor end portions 7 is increased so that the 5-phase dc motor 1 becomes large in dimension. Besides, the difficulties are encountered upon winding the conductor end portions 7 because they must be wound evenly. This winding procedure is hence cumbersome. Accordingly, such a 5-phase dc motor as described above is not suitable for mass-production.

It is to be noted, however, that since in the 5-phase dc motor 1 described above the commutator 9 includes the five commutator segments 9-1 to 9-5 and the five armature windings 5-1 to 5-5 are wound without being shifted in phase, the motor 1 need not have an electric connection of the commutator segments to each other in such a special circuit as illustrated in FIG. 9.

Even if such an advantage is taken into consideration, the 5-phase dc motor is still disadvantageous due to the drawbacks described hereinabove.

It is to be noted that phase description of shift will be given in connection with another 5-phase dc motor which will be hereinafter described and hence is omitted here.

An exemplary one of dc motors is illustrated in FIGS. 10 to 12 which have been designed to eliminate the above-described drawbacks of the 5-phase dc motor 1 and have found actual utility.

FIG. 10 is a plan view of a 10-phase dc motor 14 illustrating a relationship between a rotor armature core 17 having no armature windings wound thereon and a field magnet 16 constituting a stator of the 10-phase dc motor 14, FIG. 11 a fragmentary perspective view showing principal part of the 10-phase dc motor 14 having ten armature windings wound thereon, and FIG. 12 a developed view of the field magnet 16, the ten armature windings 19-1, 19-2, . . . , and 19-10 for the first to the tenth phases, and a commutator 15 including the ten commutator segments 15-1, 15-2, . . . , and 15-10.

Since the dc motor 14 shown in FIGS. 10 and 11 is a 10-phase dc motor, the commutator 15 is composed of the ten commutator segments 15-1 to 15-10. The field magnet 16 is composed of a pair of field magnet members 16-1 and 16-2 each formed from a segment magnet and having north and south magnetic poles, respectively, opposing an outer periphery of the rotor armature core 17. The field magnet member 16-1 and 16-2 have such a tapering configuration that the radial thickness thereof decreases gradually toward the opposite ends thereof so that the air gap 20 between the outer periphery of the rotor armature core 17 and the field magnet 16 may gradually increase toward the opposite ends of the field magnet members 16-1 and 16-2 in order to reduce a cogging torque. The ten armature windings 19-1, 19-2, . . . , and 19-10 for the ten phases, namely, the first to tenth phases are wound on ten rotor pole shoes 18 of the rotor armature core 17.

As shown in FIGS. 10 and 11, the rotor armature core 17 of the 10-phase dc motor 14 has the ten rotor pole shoes 18-1, 18-2, . . . , and 18-10 formed at angular intervals of 36° mechanical (also 36° electrical), and ten winding receiving slots 21-1, 21-2, . . . , and 21-10 defined by the rotor pole shoes 18-1 to 18-10.

As distinct from the 5-phase dc motor 1 described above, the field magnet 16 of the 10-phase dc motor 14 is constituted from the two field magnet members 16-1 and 16-2 of the north and south magnetic poles, respectively, formed from two segment magnets which are magnetized with an angular width of 144° mechanical (but 180° electrical). The field magnet 16 of such a specific configuration as described above is employed in order to make the motor at a reduced cost because employment of such a cylindrical 2-pole magnet as shown in FIG. 6 for the field magnet 16 will make the motor expensive.

The rotor armature core 17 which is formed by stacking silicon steel plates one on another have the ten rotor pole shoes 18-1 to 18-10 which extend radially at circumferentially equal intervals, and the ten armature windings 19-1 to 19-10 are wound in the ten winding receiving slots 21-1 to 21-10 formed between the ten rotor pole shoes 18-1 to 18-10.

Referring to FIG. 12, in the 10-phase dc motor 14, the armature winding 19-1 for the first phase is wound across the rotor pole shoes 18-1 to 18-4 such that one of a pair of effective conductor portions 19a and 19b thereof which contribute to generation of torque, namely, the conductor portion 19a is positioned at a location 22 indicated by a broken line in the slot 21-1 between the rotor pole shoes 18-10 and 18-1 as shown in FIG. 10 while the other effective conductor portion 19b thereof is positioned at a location 29 indicated by a broken line in the slot 21-5 between the rotor pole shoes 18-4 and 18-5 as shown in FIG. 10.

The armature winding 19-2 for the second phase is wound across the rotor pole shoes 18-2 to 18-5 such that one 19a of a pair of effective conductor portions 19a and 19b thereof is positioned at a location 24 indicated by a broken line in the slot 21-2 between the rotor pole shoes 18-1 and 18-2 while the other effective conductor portion 19b thereof is positioned at a location 31 indicated by a broken line in the slot 21-6 between the rotor pole shoes 18-5 and 18-6.

The armature winding 19-3 for the third phase is wound across the stator poles 18-3 to 18-6 such that one 19a of a pair of effective conductor portions 19a and 19b thereof is positioned at a location 26 indicated by a broken line in the slot 21-3 between the rotor pole shoes 18-2 and 18-3 while the other effective conductor portion 19b thereof is positioned at a location 33 indicated by a broken line in the slot 21-7 between the rotor pole shoes 18-6 and 18-7.

The armature winding 19-4 for the fourth phase is wound across the rotor pole shoes 18-4 to 18-7 such that one 19a of a pair of effective conductor portions 19a and 19b thereof is positioned at a location 28 indicated by a broken line in the slot 21-4 between the rotor pole shoes 18-3 and 18-4 while the other effective conductor portion 19b thereof is positioned at a location 35 indicated by a broken line in the slot 21-8 between the rotor pole shoes 18-7 and 18-8.

The armature winding 19-5 for the fifth phase is wound across the rotor pole shoes 18-5 to 18-8 such that one 19a of a pair of effective conductor portions 19a and 19b thereof is positioned at a location 30 indicated by a broken line in the slot 21-5 between the rotor pole shoes 18-4 and 18-5 while the other effective conductor portion 19b thereof is positioned at a location 37 indicated by a broken line in the slot 21-9 between the rotor pole shoes 18-8 and 18-9.

The armature winding 19-6 for the sixth phase is wound across the rotor pole shoes 18-6 to 18-9 such that one 19a of a pair of effective conductor portions 19a and 19b thereof is positioned at a location 32 indicated by a broken line in the slot 21-6 between the rotor pole shoes 18-5 and 18-6 while the other effective conductor portion 19b thereof is positioned at a location 39 indicated by a broken line in the slot 21-10 between the rotor pole shoes 18-9 and 18-10.

The armature winding 19-7 for the seventh phase is wound across the rotor pole shoes 18-7 to 18-10 such that one 19a of a pair of effective conductor portions 19a and 19b thereof is positioned at a location 34 indicated by a broken line in the slot 21-7 between the rotor pole shoes 18-6 and 18-7 while the other effective conductor portion 19b thereof is positioned at a location 41 indicated by a broken line in the slot 21-1 between the rotor pole shoes 18-10 and 18-1.

The armature winding 19-8 for the eighth phase is wound across the rotor pole shoes 18-8 to 18-1 such that one 19a of a pair of effective conductor portions 19a and 19b thereof is positioned at a location 36 indicated by a broken line in the slot 21-8 between the rotor pole shoes 18-7 and 18-8 while the other effective conductor portion 19b thereof is positioned at a location 23 indicated by a broken line in the slot 21-2 between the rotor pole shoes 18-1 and 18-2.

The armature winding 19-9 for the ninth phase is wound across the rotor pole shoes 18-9 to 18-2 such that one 19a of a pair of effective conductor portions 19a and 19b thereof is positioned at a location 38 indicated by a broken line in the slot 21-9 between the rotor pole shoes 18-8 and 18-9 while the other effective conductor portion 19b thereof is positioned at a location 25 indicated by a broken line in the slot 21-3 between the rotor pole shoes 18-2 and 18-3.

The armature winding 19-10 for the tenth phase is wound across the rotor pole shoes 18-10 to 18-3 such that one 19a of a pair of effective conductor portions 19a and 19b thereof is positioned at a location 40 indicated by a broken line in the slot 21-10 between the rotor pole shoes 18-9 and 18-10 while the other effective conductor portion 19b thereof is positioned at a location 27 indicated by a broken line in the slot 21-4 between the rotor pole shoes 18-3 and 18-4.

As the ten armature windings 19-1 to 19-10 for the first to tenth phases are wound on the rotor armature core 17 in this manner, a rotor armature 42 of the 10-phase dc motor 14 can be formed readily.

Referring to FIG. 12, ones of pairs of terminals of the armature windings 19-1 to 19-10 are electrically connected to the commutator segments 15-1 to 15-10, respectively, while the other terminals are electrically connected to the commutator segments 15-2 to 15-10 and 15-1, respectively. A brush 12-1 connected to a positive power source terminal 13-1 and another brush 12-2 connected to a negative power source terminal 13-2 are arranged in an angularly spaced relationship by an angle of 180° mechanical and held in sliding contact with the commutator 15.

The 10-phase dc motor 14 produces up to twenty torque ripples during one full rotation of the rotor armature 42 because the commutator 15 is constituted from the ten commutator segments 15-1 to 15-10. In view of view of the quantity of torque ripples, it may therefore be appreciated that the 10-phase dc motor 14 can rotate smoothly comparing with the conventional 5-phase dc motor 1 described hereinabove. Further, since the 10-phase dc motor 14 includes the ten armature windings 19 for the first to the tenth phases, a relatively high torque can be produced. Besides, since the field magnet members 16-1 and 16-2 are shaped such that the radial dimension of the air gap 20 may gradually increase from the central portions to the opposite end portions of the field magnet members 16-1 and 16-2, a cogging torque is reduced and consequently the 10-phase dc motor 14 can rotate smoothly. In addition, since also the 10-phase dc motor 14 includes the same number of commutator segments as the number of phases of the motor (armature windings) and does not involve phase shift, it is advantageous in that it requires no troublesome operation to electrically connect the commutator segments to each other.

However, in the case of the 10-phase dc motor 14, the armature windings 19-1 to 19-10 constituting the individual phases overlap at conductor end portions 43 thereof in three layers with the other six armature windings over a great angular range at the opposite ends of the rotor armature core 17. The thickness of the conductor end portions 43 of the armature windings 19-1 to 19-10 therefore becomes extremely larger, whereby the axial length and the overall size of the motor 14 are increased comparing with the 5-phase dc motor 1 described above. Therefore, the 10-phase dc motor 14 is disadvantageous in that the overall size of the motor increases, that handling of the conductor end portions 43 of the armature windings 19-1 to 19-10 is troublesome and winding of the armature windings 19-1 to 19-10 is also cumbersome, and that the motor 14 cannot be produced at a low cost. Besides, since the field magnet members 16-1 and 16-2 are disposed in a spaced relationship by a considerable distance, no torque is generated within a considerable part of one full rotation of the 10-phase dc motor 14, which deteriorates the efficiency of the motor 14. In addition, since the field magnet members 16-1 and 16-2 are shaped such that the radial thickness of the air gap 20 increases towards the opposite ends of the field magnet members 16-1 and 16-2, the magnetic fluxes are reduced toward the ends of the field magnet members 16-1 and 16-2 so that a high torque cannot be produced and the efficiency is low.

The 10-phase dc motor 14 thus has significant defects in spite of its improvement in torque ripples.

A 5-phase dc motor which is an improvement of the 10-phase dc motor 14 is shown in FIGS. 13 and 14. Referring to FIGS. 13 and 14, the 5-phase dc motor 44 shown utilizes a similar rotor armature core 17 to the rotor armature core 17 of the 10-phase dc motor 14 described above, but the rotor armature core 17 of the 5-phase dc motor 44 is different in quantity and winding method of armature windings.

The dc motor 44 includes a commutator 45 which is formed from up to ten commutator segments 45-1, 45-2, . . . , and 45-10 in order to reduce the magnitude of torque ripples to attain smoother rotation of the dc motor 44, and further includes such a 2-pole field magnet 11 as used in the dc motor 1. Up to five armature windings 46-1, 46-2, . . . , and 46-5 for the first to the fifth phases are wound on the rotor armature core 17, thereby constituting a rotor armature 47.

The rotor armature core 17 which is formed by stacking silicon steel plates one on another have ten rotor pole shoes 18-1, 18-2, . . . , and 18-10 which extend radially at circumferentially equal intervals, and the five armature windings 46-1 to 46-5 are wound in ten winding receiving slots 21-1, 21-2, . . . , and 21-10 formed between the ten rotor pole shoes 18-1 to 18-10.

Referring to FIG. 14, in the 5-phase dc motor 44, the armature winding 46-1 for the first phase is wound across the rotor pole shoes 18-1 to 18-5 such that one 46a of a pair of effective conductor portions 46a and 46b thereof which contribute to generation of torque is located in the slot 21-1 between the rotor pole shoes 18-10 and 18-1 while the other effective conductor portion 46b thereof is located in the slot 21-6 between the rotor pole shoes 18-5 and 18-6.

The armature winding 46-2 for the second phase is wound across the rotor pole shoes 18-3 to 18-7 such that one 46a of a pair of effective conductor portions 46a and 46b thereof is located in the slot 21-3 between the rotor pole shoes 18-2 and 18-3 while the other effective conductor portion 46b thereof is located in the slot 21-8 between the rotor pole shoes 18-7 and 18-8.

The armature winding 46-3 for the third phase is wound across the rotor pole shoes 18-5 to 18-9 such that one 46a of a pair of effective conductor portions 46a and 46b thereof is located in the slot 21-5 between the rotor pole shoes 18-4 and 18-5 while the other effective conductor portion 46b thereof is located in the slot 21-10 between the rotor pole shoes 18-9 and 18-10.

The armature winding 46-4 for the fourth phase is wound across the rotor pole shoes 18-7 to 18-1 such that one 46a of a pair of effective conductor portions 46a and 46b thereof is located in the slot 21-7 between the rotor pole shoes 18-6 and 18-7 while the other effective conductor portion 46b thereof is located in the slot 21-2 between the rotor pole shoes 18-1 and 18-2.

The armature winding 46-5 for the fifth phase is wound across the rotor pole shoes 18-9 to 18-3 such that one 46a of a pair of effective conductor portions 46a and 46b thereof is located in the slot 21-9 between the rotor pole shoes 18-8 and 18-9 while the other effective conductor portion 46b thereof is located in the slot 21-4 between the rotor pole shoes 18-3 and 18-4.

By winding the five armature windings 46-1 to 46-5 for the first to fifth phases on the rotor armature core 17 in this manner, the rotor armature 47 of the 5-phase dc motor 44 can be formed readily.

Ones of pairs of terminals of the armature windings 46-1 to 46-5 are electrically connected to the commutator segments 45-1 to 45-5, respectively, while the other terminals are electrically connected to the commutator segments 45-7 to 45-10 and 45-6, respectively, and the commutator segments 45-1 and 45-6, 45-2 and 45-7, 45-3 and 45-8, 45-4 and 45-9, and 45-5 and 45-10 which are located at the mutually same phase positions are electrically connected to each other. A brush 12-1 connected to a positive power source terminal 13-1 and another brush 12-2 connected to a negative power source terminal 13-2 are arranged in an angularly spaced relationship by an angle of 180° mechanical and held in sliding contact with the commutator 45.

The 5-phase dc motor 44 produces up to twenty torque ripples during one full rotation of the rotor armature 47 similarly to the 10-phase dc motor 14 because the commutator 45 is constituted from the ten commutator segments 45-1 to 45-10. Accordingly, in view of the quantity of torque ripples, it can be appreciated that the 5-phase dc motor 44 can rotate smoothly comparing with the conventional 5-phase dc motor 1 described above. Further, since the 5-phase dc motor 44 includes the five armature windings 46 for the first to the fifth phases, the armature windings 46-1 to 46-5 constituting the individual phases overlap at conductor end portions 48 thereof in two layers with the other four armature windings. However, comparing with the 10-phase dc motor 14, the armature windings overlap with each other in a reduced number of layers by 2 in number of armature windings, that is, with the thickness reduced by the thickness of one armature winding. Accordingly, the 5-phase dc motor 44 is advantageous in that the armature windings 46-1 to 46-5 thereof can be wound readily comparing with those of the dc motor 14 and it can hence be superior in mass-productivity. Besides, since the quantity of the armature windings 46 is reduced by 5, the 5-phase dc motor 44 can be produced at a reduced cost accordingly.

Also in the case of the 10-phase dc motor 44, however, the armature windings 46 overlap at conductor end portions 48 thereof in four layers with the other armature windings 46 over a great angular range at the opposite ends of the rotor armature core 17. Accordingly, the thickness of the conductor end portions 48 of the armature windings 46 becomes extremely larger so that the motor 44 is formed in great dimensions. The 5-phase dc motor 44 is further disadvantageous in that handling of the conductor end portions 48 of the armature windings 46 is troublesome and winding of the armature windings 46 is also cumbersome, and that the motor 44 cannot be mass-produced at a low cost.

Besides, since the commutator 45 includes the ten commutator segments 45-1 to 45-10, it is necessary to electrically connect the commutator segments 45-1 to 45-10 to each other using conductors or to electrically connect those of the commutator segments located at positions displaced by an electrical angle of $2\pi$ radians (=360 degrees) in phase to each other using a printed circuit board on which a printed wiring pattern is formed for providing crossover tracks for facilitating electric connection between the commutator segments using such conductors. Accordingly, the 5-phase dc motor 44 is disadvantageous in that the production steps are increased in number, resulting in increase in cost.

In view of those points, the inventors and a participant of the present invention have previously developed such a 5-phase dc motor as shown in FIGS. 15 to 20 which eliminates the defects of the conventional 5-phase dc motors 1 and 43 and those of the 10-phase dc motor 14 described hereinabove.

The improved 5-phase dc motor will now be described with reference to FIGS. 15 to 20. The improved 5-phase dc motor 49 employs such a rotor armature core 3 as in the conventional 5-phase dc motor 1 described above. The rotor armature core 3 thus has up to five rotor pole shoes 4-1, 4-2, ..., and 4-5, and five winding receiving slots 6-1, 6-2, ..., and 6-5 defined by the rotor pole shoes 4-1 to 4-5 similarly as in the conventional 5-phase dc motor 1. Accordingly, like parts or elements are denoted by like reference numerals to those of the conventional 5-phase dc motor 1, and detailed description of such common parts is omitted herein.

FIG. 15 is a plan view illustrating a relationship between the rotor armature core 3 having no armature wirings mounted thereon and a field magnet 50 serving as a stator with a motor body omitted, FIG. 16 a plan view of the 5-phase dc motor 49 with the motor body omitted, FIG. 17 a perspective view of a rotor armature 52 including five armature windings 51-1, 51-2, ..., and 51-5 for the first to the fifth phases wound on the rotor armature core 3 of FIG. 16, FIG. 18 a perspective view of a printed circuit board 53 which provides crossover tracks for electric connection between commutator segments by means of conductors, FIG. 19 a perspective view of the rotor armature 52 on which the printed circuit board 53 of FIG. 18 is mounted, and FIG. 20 a developed view of the field magnet 50, the five armature windings 51-1 to 51-5 for the first to the fifth phases, and a commutator 54 including ten commutator segments 54-1, 54-2, ..., and 54-10.

As distinct from the field magnet 11 of the dc motor 1 described hereinabove, the field magnet 50 of the improved 5-phase dc motor 49 has up to four north and south magnetic poles or pole zones having an angular width of 90° mechanical (180° electrical). The rotor armature core 3 which is formed by stacking silicon steel plates one on another have five rotor pole shoes 4-1, 4-2, ..., and 4-5, which extend radially at circumferentially equal intervals, and the five armature windings 51-1 to 51-5 are wound on the five rotor pole shoes 4-1 to 4-5, respectively.

The improved 5-phase dc motor 49 is different from the conventional 5-phase dc motor 1 in that the commutator 54 is constituted from the ten commutator segments 54-1 to 54-10 and the five armature windings 51-1 to 51-5 are wound at different positions.

Particularly, the five armature windings 51-1 to 51-5 are wound at different positions in order to assure phase shift.

Here, the definition of phase shift is described. Referring to the developed view of FIG. 9, for example, the armature winding 5-2 for the second phase overlaps with the armature windings 5-1 and 5-3, and the armature winding 5-4 overlaps with the armature windings 5-3 and 5-5, leading to various disadvantages. The armature windings 5-2 and 5-4 are therefore shifted to the respective same phase positions so that they may not overlap with any other winding. Such shifting is called phase shift.

In the arrangement shown in FIG. 9, however, phase shift of the armature windings 5-2 and 5-4 will cause their overlapping with other ones of the armature windings. Actually, therefore, such a field magnet 50 as shown in FIG. 20 wherein the number of magnetic poles or pole zones is twice that of the field magnet 11 is therefore employed in place of the field magnet 111, and the armature windings 5-2 and 5-4 are thus shifted to and arranged at respective same phase positions so that they may not overlap with any other armature winding, similarly to the armature windings 52-2 and 52-4 of the motor 49 of FIG. 20.

Referring to FIG. 20, in the 5-phase dc motor 52, the armature winding 51-1 for the first phase is wound on the rotor pole shoe 4-1 positioned at the angular location of about a•4$\pi$ (a is 0 here) radians, that is, 0° electrical (similar in mechanical angle) such that one of a pair of effective conductor portions 51a and 51b thereof which contribute to generation of torque, namely, the conductor portion 51a is positioned at a location 55 indicated by a broken line (refer to FIG. 15) in the slot 6-1 between the rotor pole shoes 4-5 and 4-1 while the other effective conductor portion 51b thereof is positioned at a location 56 indicated by a broken line in the slot 6-2 between the rotor pole shoes 4-1 and 4-2.

The armature winging 51-3 for the third phase is wound on the second rotor pole shoe 4-2 positioned at a location spaced by an angle of about b•4$\pi$/5 (b is 1 here) radians, that is, 144° electrical (72° mechanical) from the first rotor pole shoe 4-1 such that on 51a of a pair of effective conductor portions 51a and 51b thereof is positioned at a location 57 indicated by a broken line in the slot 6-2 between the rotor pole shoes 4-1 and 4-2 while the other effective conductor portion 51b thereof is positioned at a location 58 indicated by a broken line in the slot 6-3 between the rotor pole shoes 4-2 and 4-3.

The armature winding 51-5 for the fifth phase is wound on the third rotor pole shoe 4-3 positioned at a location spaced by an angle of about $c \cdot 4\pi/5$ (c is 2 here) radians, that is, 288° electrical (144° mechanical) from the first rotor pole shoe 4-1 such that one 51a of a pair of effective conductor portions 51a and 51b thereof is positioned at a location 59 indicated by a broken line in the slot 6-3 between the rotor pole shoes 4-2 and 4-3 while the other effective conductor portion 51b thereof is positioned at a location 60 indicated by a broken line in the slot 6-4 between the rotor pole shoes 4-3 and 4-4.

The armature winding 51-2 for the second phase is wound on the fourth rotor pole shoe 4-4 positioned at a location spaced by an angle of about $d \cdot 4\pi/5$ (d is 3 here) radians, that is 432° electrical (216° mechanical) from the first rotor pole shoe 4-1 such that one 51a of a pair of effective conductor portions 51a and 51b thereof is positioned at a location 61 indicated by a broken line in the slot 6-4 between the rotor pole shoes 4-3 and 4-4 while the other effective conductor portion 51b thereof is positioned at a location 62 indicated by a broken line in the slot 6-5 between the rotor pole shoes 4-4 and 4-5.

The armature winding 51-4 for the fourth phase is wound on the fifth rotor pole shoe 4-5 positioned at a location spaced by an angle of about $e \cdot 4\pi/5$ (e is 4 here) radians, that is 576° electrical (288° mechanical) from the first rotor pole shoe 4-1 such that one 51a of a pair of effective conductor portions 51a and 51b thereof is positioned at a location 63 indicated by a broken line in the slot 6-5 between the rotor pole shoes 4-4 and 4-5 while the other effective conductor portion 51b thereof is positioned at a location 64 indicated by a broken line in the slot 6-1 between the rotor pole shoes 4-5 and 4-1.

In this manner, the rotor armature 52 is constituted from the armature windings 51-1, 51-3, 51-5, 51-2 and 51-4 which are wound in a spaced relationship in phase by an angle of 144 electrical from each other on the rotor pole shoes 4-1 to 4-5, respectively, of the rotor armature core 3.

As shown in FIG. 20, ones of pairs of terminals of the armature windings 51-1, 51-3, 51-5, 51-2 and 51-4 are electrically connected to the armature segments 54-1 54-3, 54-5, 54-7 and 54-9, respectively, while the other terminals are electrically connected to the armature segments 54-2, 54-4, 54-6, 54-8 and 54-10, respectively, The commutator segments which are positioned at the same phase positions displaced by an electrical angle of $2\pi$ radians (+360 degrees), that is, the commutator segments 54-1 and 54-6, 54-2 and 54-7, 54-3 and 54-8, 54-4 and 54-9, and 54-5 and 54-10, are electrically connected to each other.

Electric connection between the commutator segments at the same phase positions displaced by an electrical angle of $2\pi$ radians from each other cannot, however, be attainted so readily as in the 5-phase dc motor 1 described above. In order to facilitate such electric connection, such a printed circuit board 53 as shown in FIGS. 18 and 19 is used. In particular, the printed circuit board 53 has five printed wiring patterns 65-1, 65-2, ..., and 65-5 formed thereon. Each of the printed wiring patterns 65-1 to 65-5 extends spirally between two same phase positions displaced by an electrical angle of $2\pi$ radians in phase and constitutes a crossover track for facilitating electric connection between suitable commutator segments. The commutator segments at the same phase positions displaced by an electrical angle of $2\pi$ radians (=360 degrees), that is, the commutator segments 54-1 and 54-6, 54-2 and 54-7, 54-3 and 54-8, 54-4 and 54-9, and 54-5 and 54-10, are thus electrically connected to each other using the printed circuit board 53.

More particularly, the printed circuit board 53 has a substantially annular shape, and conductor portions 66 and 67 are formed at portions along inner and outer edges of the printed circuit board 53. The printed wiring patterns 65-1 to 65-5 for providing the five crossover tracks are formed in such a spiral configuration that each of them interconnects the conductor portions 66 and 67 at the positions displaced by an angle of 180° mechanical (360° electrical). Using the printed circuit board 53, the commutator segments displaced by an electrical angle of 360 degrees are connected to the same printed wiring patterns 65-1 to 65-5 by way of short conductor lines soldered to the conductor portions 66 and 67 and the commutator segments, or where the printed circuit board 53 is formed with a sufficiently small diameter, the commutator segments and the conductor portions 66 and 67 of the printed circuit board 53 may suitably be soldered to each other. Thus, such a troublesome operation to electrically connect suitable commutator segments to each other using conductors to form long crossover tracks is eliminated.

Referring back to FIG. 20, a pair of brushes 12-1 and 12-2 are disposed in an angularly spaced relationship by an angle of 180° electrical (90° mechanical) and held in sliding contact with the commutator 54. Electric current is thus supplied successively to the armature windings 51-1 to 51-5 via a positive power source terminal 13-1 and a negative power source terminal 13-2 and via the commutator 54 so that the rotor armature 52 produces a rotational torque and is rotated in a predetermined direction relative to the field magnet 50.

With the 5-phase dc motor 49 of such a construction as described above, the commutator 54 is constituted of up to ten commutator segments which are increased by 5 in number comparing with the 5-phase dc motor 1 described hereinabove. Accordingly, as the commutator 54 makes one full rotation, the current is changed over twenty times. Therefore, the number of torque ripples is twice that of the 5-phase dc motor 1, which assures smoother rotation of the motor than the 5-phase dc motor 1.

Besides, the armature windings 51 can be wound on the rotor armature core 3 such that conductor end portions 68 thereof may not overlap with each other. Since the conductor end portions 68 can thus be handled very easily comparing with the 5-phase dc motors 1 and 44 and also with the 10-phase dc motor 14 described above, the armature windings 51 can be wound easily and the 5-phase dc motor is accordingly suitable for mass-production at a low cost.

The improved 5-phase dc motor 49 is very useful in that the armature windings 51 can be wound easily, that it is excellent in mass-productivity, and that it rotates smoothly because torque ripples are smooth.

The 5-phase dc motor 49, however, has a drawback that it cannot be produced at a sufficiently reduced cost because the process of producing the same still includes a step to establish electric connection between the commutator segments at the same phase positions to each other either by soldering conductors to form long crossover tracks to the commutators or by soldering the commutator segments to the printed wiring patterns 65-1 to 65-5 formed on the printed circuit board 53 and providing such crossover tracks.

SUMMARY OF THE INVENTION

Accordingly, it is an object of the present invention to provide a 5-phase dc motor which can be mass-produced readily at a reduced cost.

In order to attain the object, according to the present invention, there is provided a 5-phase dc motor which comprises a stator including a field magnet having four alternate north and south magnetic poles of an equal angular width, a rotor including a rotor armature core having five rotor pole shoes formed at equal angular intervals thereon, the rotor pole shoes including a first rotor pole shoe formed at a position of about $a \cdot 4\pi$ radians in electrical angle, a being 0, a second rotor pole shoe formed at a position spaced by an angular distance of about $b \cdot 4\pi/5$ radians in electrical angle from the first rotor pole shoe, be being 1, a third rotor pole shoe formed at a position spaced by an angular distance of about $c \cdot 4\pi/5$ radians in electrical angle from the first rotor pole shoe, c being 2, an fourth rotor pole shoe formed at a position spaced by an angular distance of about $d \cdot 4\pi/5$ radians in electrical angle from the first rotor pole shoe, d being 3, and a fifth rotor pole shoe formed at a position spaced by an angular distance of about $e \cdot 4\pi/5$ radians in electrical angle from the first rotor pole shoe, e being 4, the rotor further including a commutator composed of ten commutator segments, first to tenth provided successively in an adjacent relationship on the rotor, a first brush connected to a positive power source terminal, a second brush connected to a negative power source terminal, the first and second brushes being disposed in a spaced relationship by an angular distance of 90° mechanical and for sliding contact with the commutator, and a conductor electrically connected to the first commutator segment and wound around the first rotor pole shoe to form an armature winding for the first phase, the conductor being introduced from the armature winding for the first phase to the second commutator segment to establish electric connection to the second commutator segment and further along an end face of the rotor armature core to the seventh commutator segment at the same phase position as the second commutator segment to establish electric connection to the seventh commutator segment, the conductor from the seventh commutator segment being further wound around the fourth rotor pole shoe formed at the position spaced by the angular distance of about $d \cdot 4\pi/5$ radians in electrical angle from the first rotor pole shoe to form an armature winding for the second phase, the conductor being introduced from the armature winding for the second phase to the eighth commutator segment to establish electric connection of the eighth commutator segment and further along the end face of the rotor armature core to the third commutator segment at the same phase position as the third commutator segment to establish electric connection to the third commutator segment, the conductor from the third commutator segment being further wound around the second rotor pole shoe formed at the position spaced by the angular distance of about $b \cdot 4\pi/5$ radians in electrical angle from the first rotor pole shoe to form an armature winding for the third phase, the conductor being introduced from the armature winding for the third phase to the fourth commutator segment to establish electric connection to the fourth commutator segment and further along the end face of the rotor armature core to the ninth commutator segment at the same phase position as the fourth commutator segment to establish electric connection to the ninth commutator segment, the conductor from the ninth commutator segment being further wound around the fifth rotor pole shoe formed at the position spaced by the angular distance of about $e \cdot 4\pi/5$ radians in electrical angle from the first rotor pole shoe to form an armature winding for the fourth phase, the conductor being introduced from the armature winding for the fourth phase to the tenth commutator segment to establish electric connection to the tenth commutator segment and further along the end face of the rotor armature core to the fifth commutator segment at the same phase position as the tenth commutator segment to establish electric connection to the fifth commutator segment, the conductor from the fifth commutator segment being further wound around the third rotor pole shoe formed at the position spaced by the angular distance of about $c \cdot 4\pi/5$ radians in electrical angle from the first rotor pole shoe to form an armature winding for the fifth phase, the conductor being introduced from the armature winding for the fifth phase to the sixth commutator segment to establish electric connection to the sixth commutator segment and further along the end face of the rotor armature core to the first commutator segment at the same phase position as the sixth commutator segment to establish electric connection to the first commutator segment.

With the 5-phase dc motor of the present invention, the current is switched over twenty times while the commutator makes one full rotation because the commutator of the 5-phase dc motor is constituted from ten commutator segments which are increased by five in number comparing with the 5-phase dc motor 1 described hereinabove, and accordingly the number of torque ripples is twice that of the 5-phase dc motor 1. Namely, the number of torque ripples is increases by ten, and the -phase dc motor of the present invention can hence attain very smooth rotation. Besides, since conductor end portions of the armature windings do not overlap with any other armature winding as in the 10-phase dc motor 14 or the 5-phase dc motor 44 described hereinabove, the 5-phase dc motor can be reduced in axial length and in overall size, and since there is no troublesome operation of handling conductor end portions of the armature windings, the 5-phase dc motor of the present invention can be mass-produced readily at a low cost.

In addition, even if phase shifting is adopted in order to double the number of phases of an electric motor so that torque ripples are rendered smoother as in the 5-phase dc motor 49 described hereinabove and each of armature windings is prevented from overlapping with any other armature windings, an electric circuit for the motor including the armature windings can be completed only by introducing a single conductor in a predetermined order to the prescribed rotor pole shoes and the commutator segments and fixing the conductor close to the commutator segments by suitable means to establish electric connection of the conductor to the commutator segments. The completion of the above electric current can be achieved without establishing electric connection between the commutator segments, for example, at the same phase positions, by soldering or a printed circuit board, which has a suitable printed wiring pattern, with a soldering device at the next stage of subsequent assembly. Thus, according to the present invention, 5-phase dc motors of a high efficiency which have a reduced axial length without conductor end portions of armature windings overlapping with each other and can rotate very smoothly with minimized torque ripples in magnitude can be massproduced readily at a low cost.

The above and other objects, features and advantages of the present invention will become apparent from the following description and the appended claims, taken in conjunction with the accompanying drawing.

DESCRIPTION OF THE PREFERRED EMBODIMENTS

Figure 1:
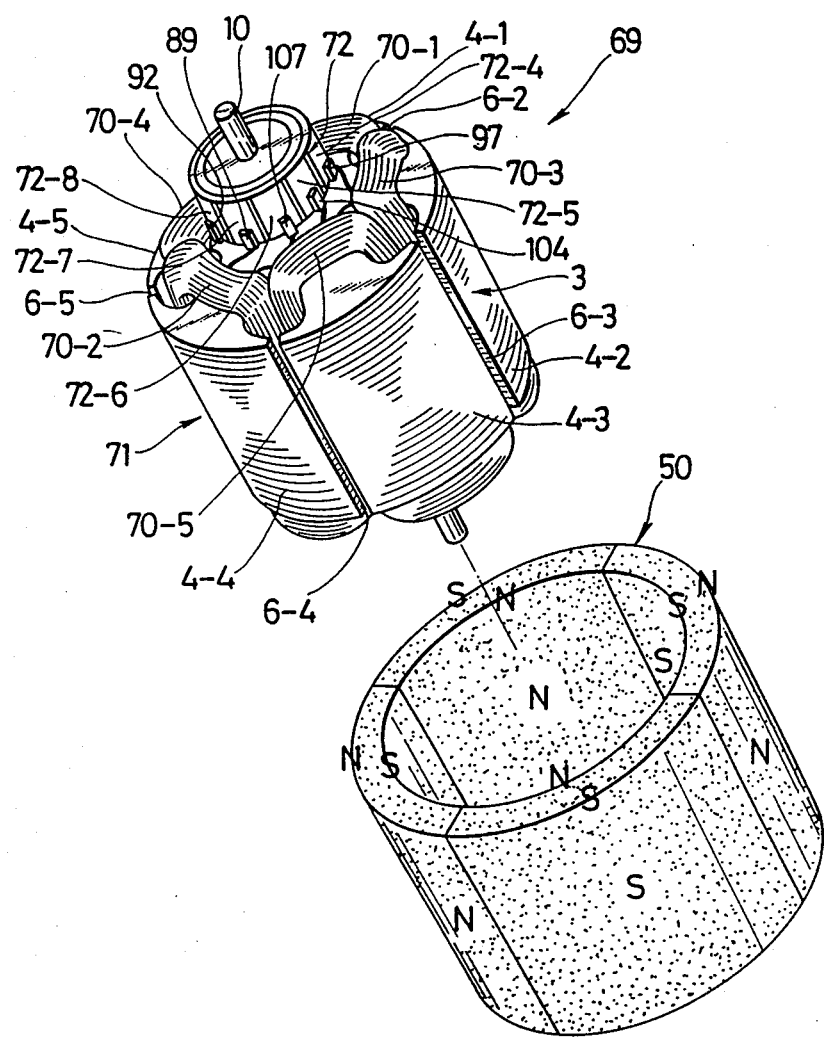
FIG. 1 is a fragmentary perspective view showing principal components of a 5-phase dc motor according to the present invention.
Figure 2:
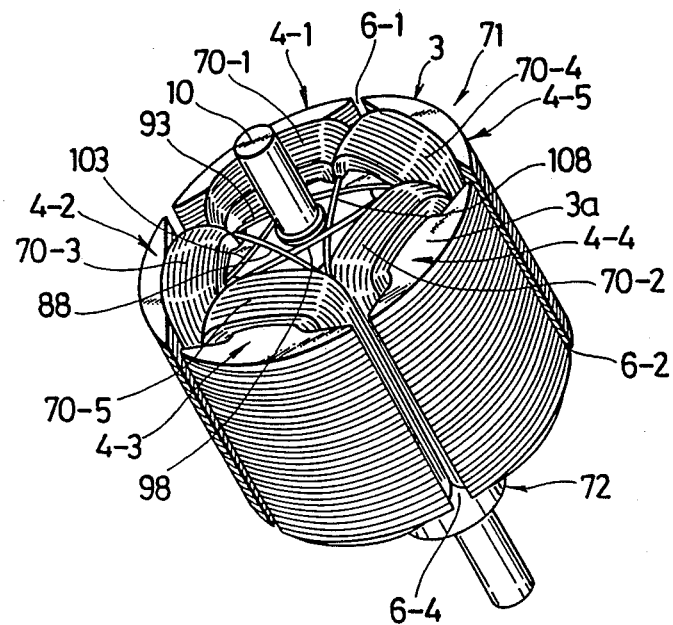
FIG. 2 is a perspective view of a rotor armature of the motor of FIG. 1 as view obliquely from below.

Referring to FIGS. 1 to 5, there is shown a 5-phase dc motor according to the present invention. The 5-phase dc motor of the present invention in generally denoted at 69 and has a generally similar construction to that of the 5-phase dc motor 49 described hereinabove in that it employs a rotor armature core 3 which is similar to the rotor armature core 3 of the conventional 5-phase dc motor 1 thus has up to five rotor pole shoes 4-1, 4-2, . . . , and 4-5 and five winding receiving slots 6-1, 6-2, . . . , and 6-5 defined by the rotor pole shoes 4-1 to 4-5. Thus, in FIGS. 1 to 5, like parts or elements are denoted by like reference numerals to those of the conventional 5-phase dc motor 49 described hereinabove, and overlapping description thereof will be omitted herein to avoid redundancy.

More particularly, the 5-phase dc motor 69 includes a field magnet 50 which has alternate north and south magnetic poles or pole zones magnetized with an angular width of 90° mechanical (180° electrical). The rotor armature core 3, which is formed by stacking silicon steel plates one on another have the five rotor pole shoes 4-1 to 4-5 for the first to the fifth phases which extend radially at circumferentially equal intervals, and up to five armature windings 70-1, 70-2, . . . , and 70-5 are wound on the five rotor pole shoes 4-1 to 4-5, respectively, similarly as in the 5-phase dc motor 49 described hereinabove. The manner in which the armature windings 70-1 to 70-5 are wound, however, is different from that of the 5-phase dc motor 49 and will be hereinafter described in detail.

Figure 3:
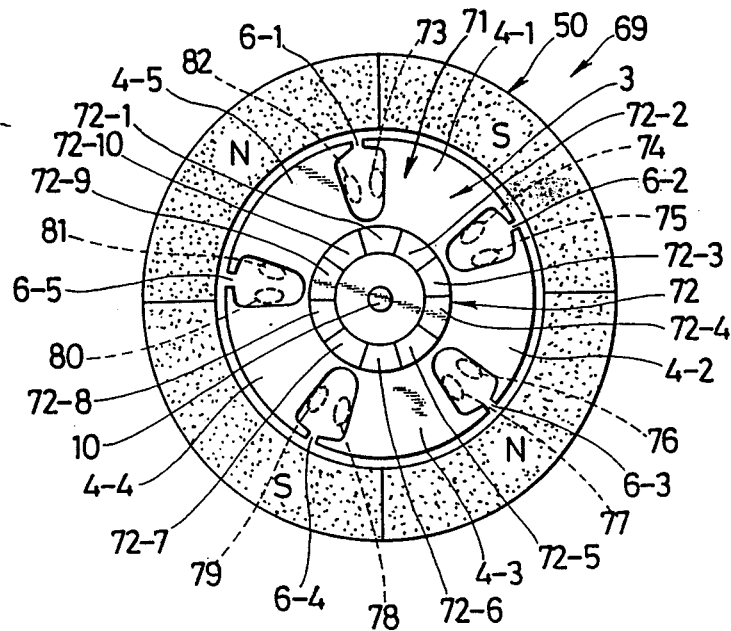
FIG. 3 is a plan view showing a rotor armature core with no armature windings wound thereon and a 4-pole field magnet with a motor body omitted.
Figure 4:
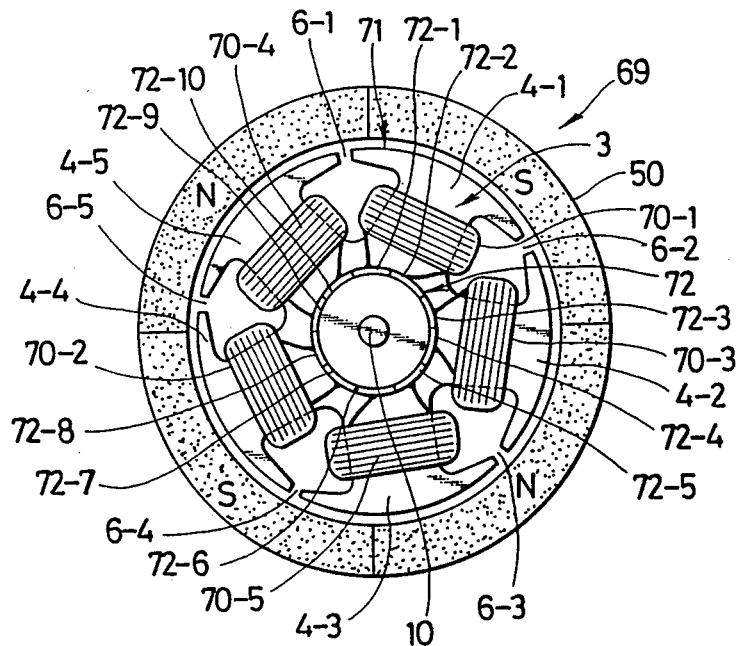
FIG. 4 is a similar view showing the rotor armature having armature windings wound on the rotor armature core thereof.
Figure 5:
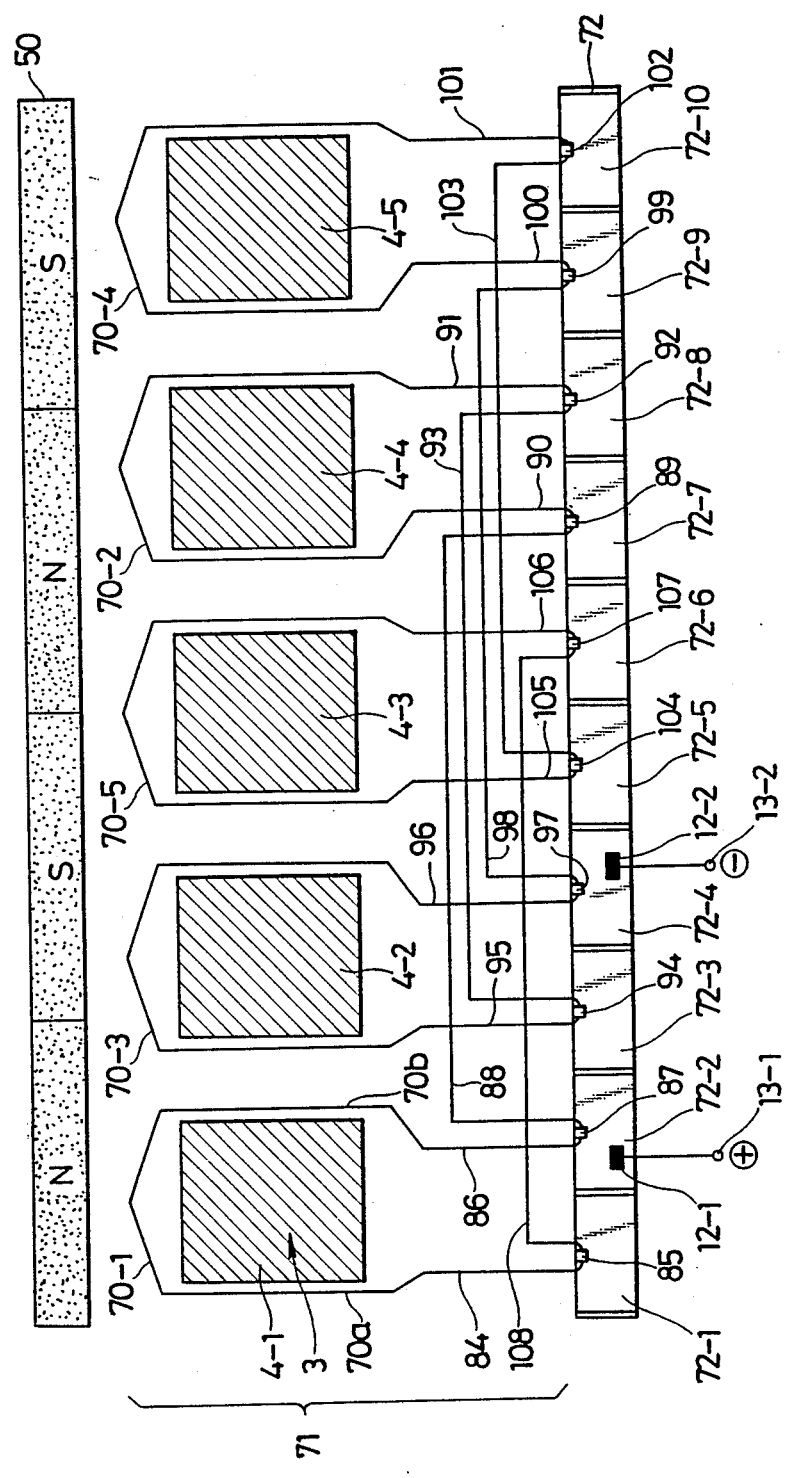
FIG. 5 is a developed view of the 4-pole field magnet and a commutator including the five armature windings for the first to the fifth phases and ten commutator segments.
Figure 6:
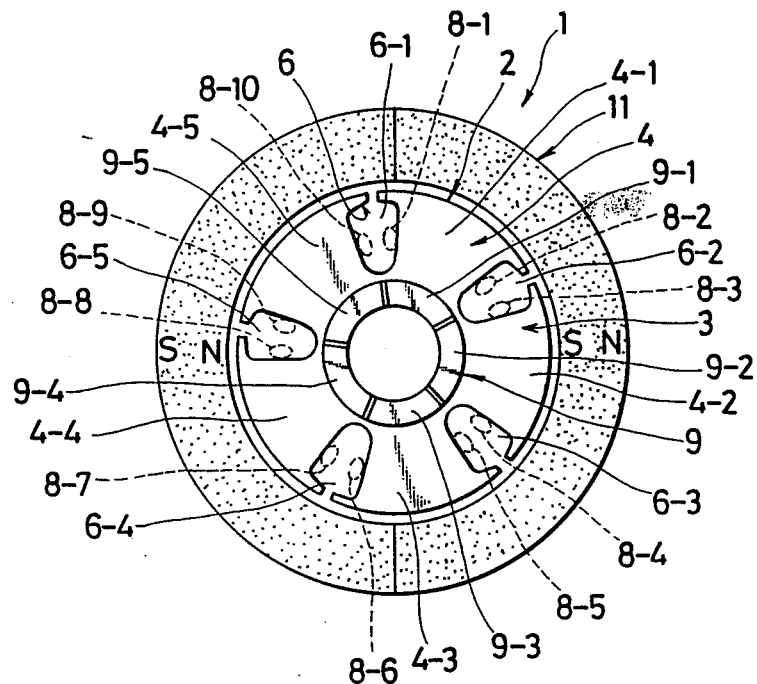
FIG. 6 is a plan view showing a conventional 5-phase dc motor of the rotor pole shoe type and illustrating a relationship between a rotor armature core with no armature windings wound thereon and a 2-pole field magnet serving as a stator.
Figure 7:
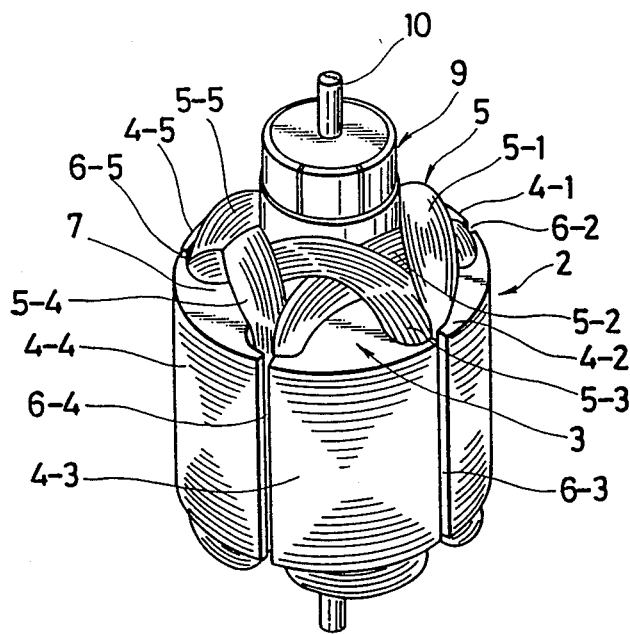
FIG. 7 is a perspective view of a rotor armature of the conventional 5-phase dc motor of FIG. 6.
Figure 8:
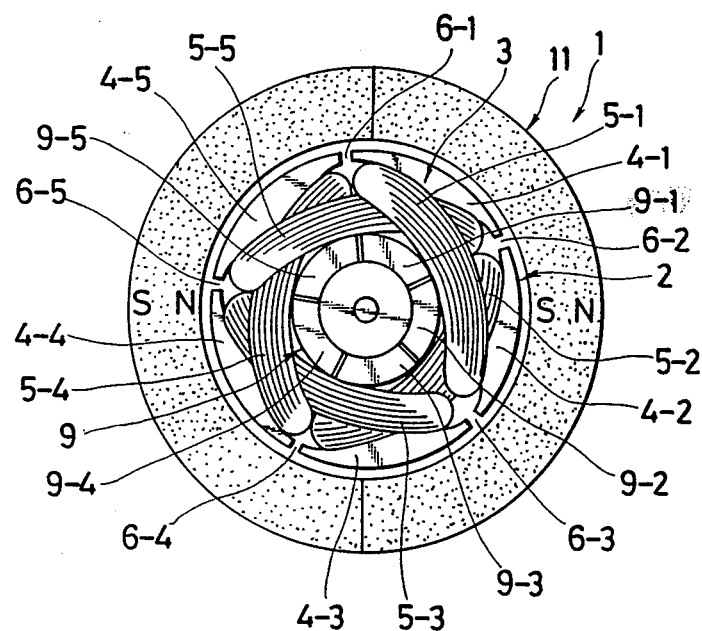
FIG. 8 is a plan view of the conventional 5-phase dc motor of FIG. 6 with a motor body omitted.
Figure 9:
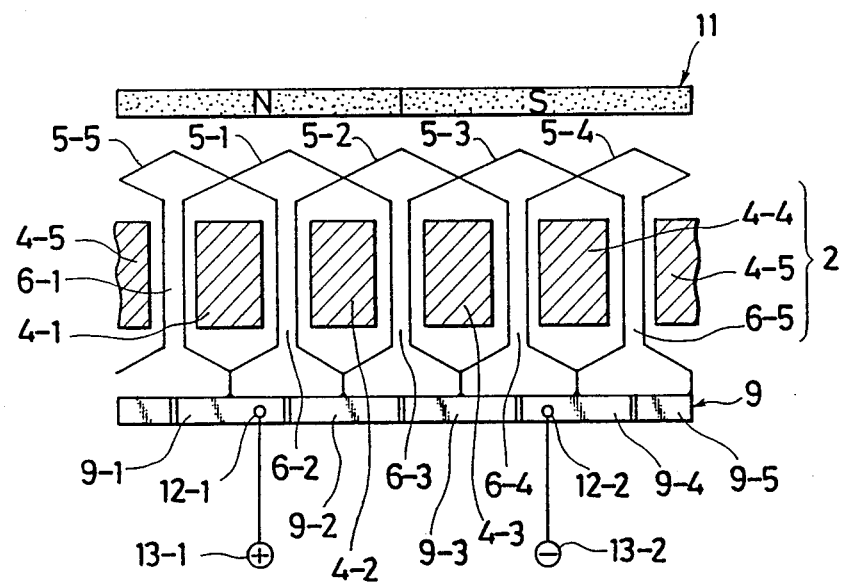
FIG. 9 is a developed view of a 2-pole field magnet and a commutator including five armature windings for the first to the fifth phases and five commutator segments.
Figure 10:
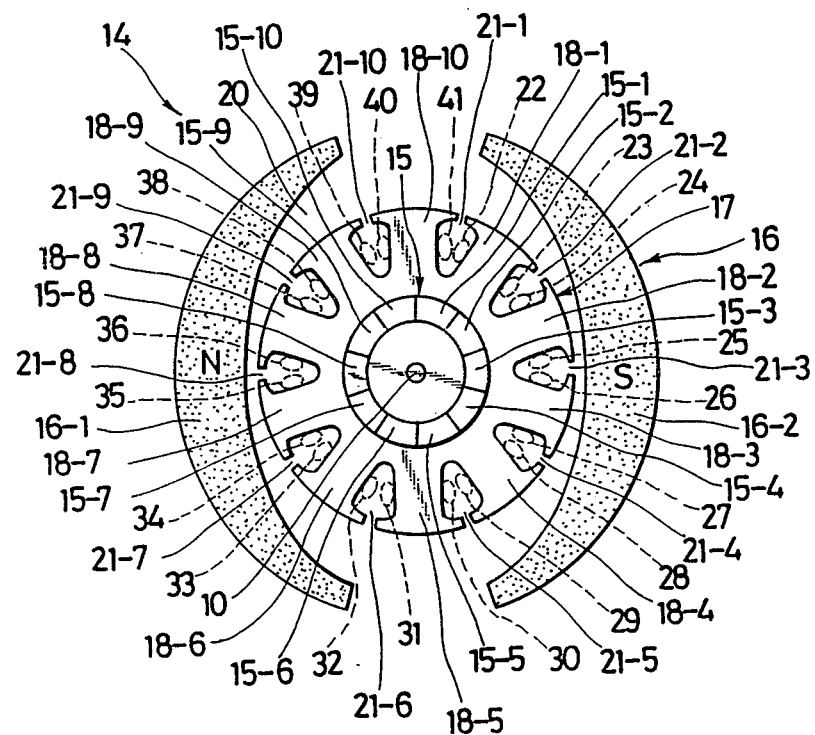
FIG. 10 is a plan view showing a conventional 10-phase dc motor and illustrating a relationship between a rotor armature core with no armature windings wound thereon and a field magnet serving as a stator with a motor body omitted.
Figure 11:
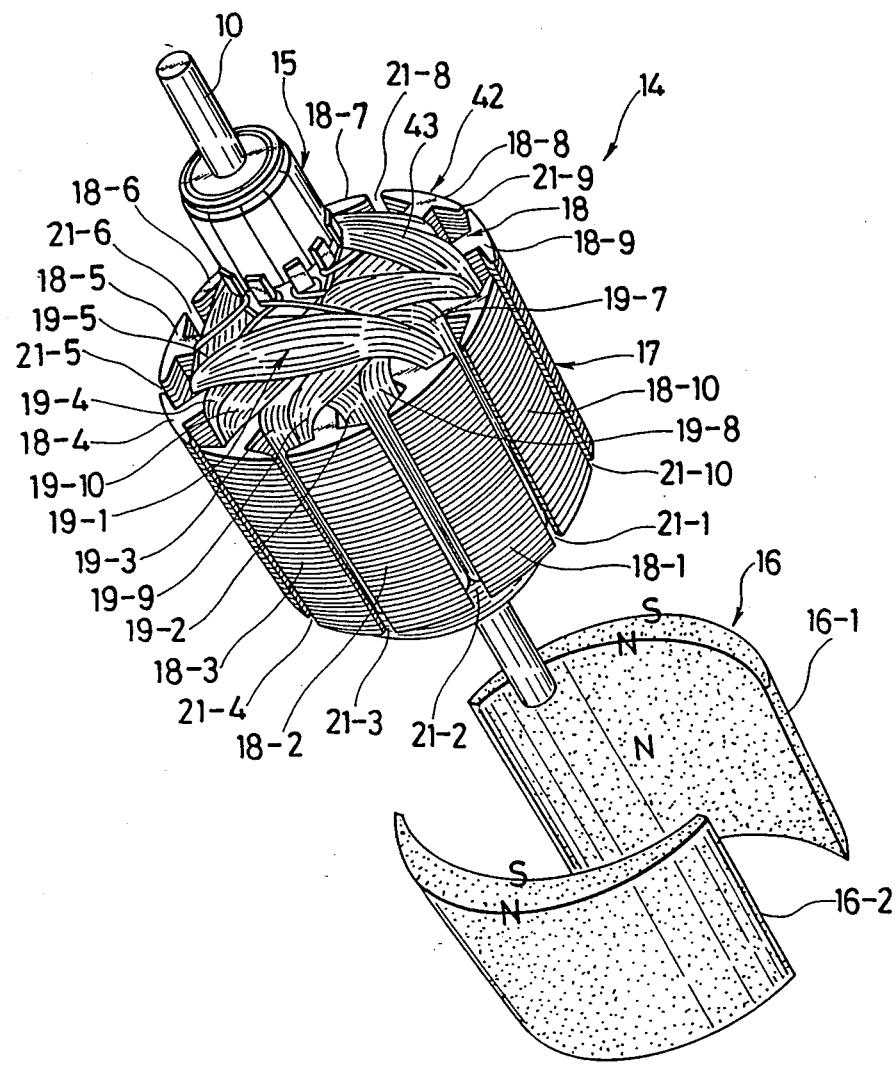
FIG. 11 is a fragmentary perspective view illustrating principal components of the 10-phase dc motor of FIG. 10 wherein ten armature windings are wound on the armature core.
Figure 12:
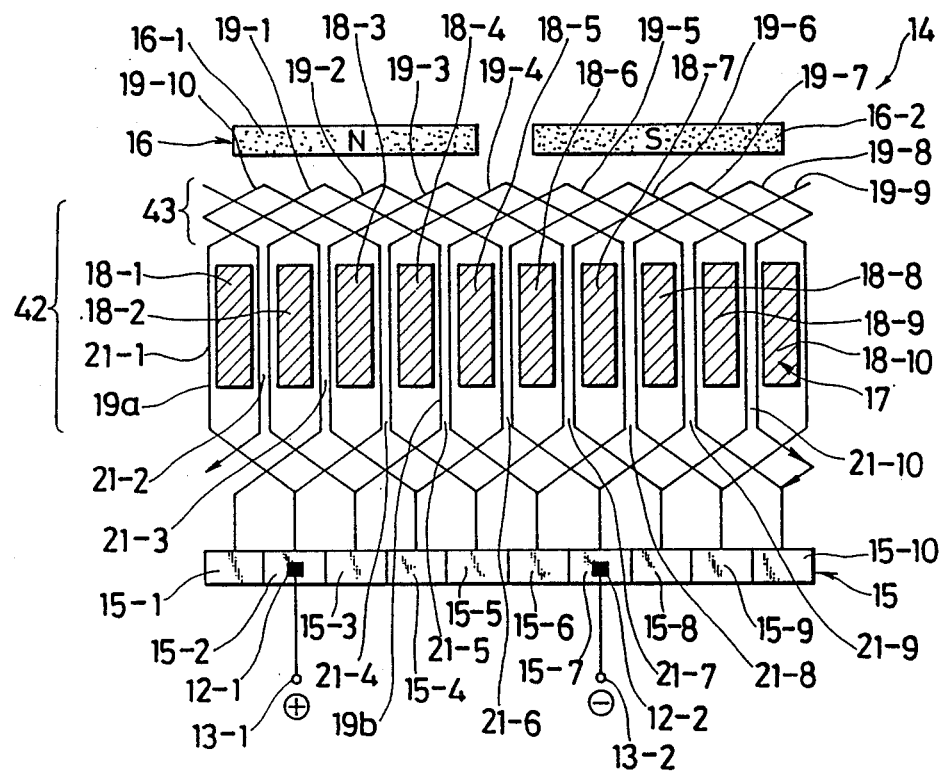
FIG. 12 is a developed view of the 2-pole field magnet, the ten armature windings for the first to the tenth phases, and a commutator including ten commutator segments in the motor of FIG. 10.
Figure 13:
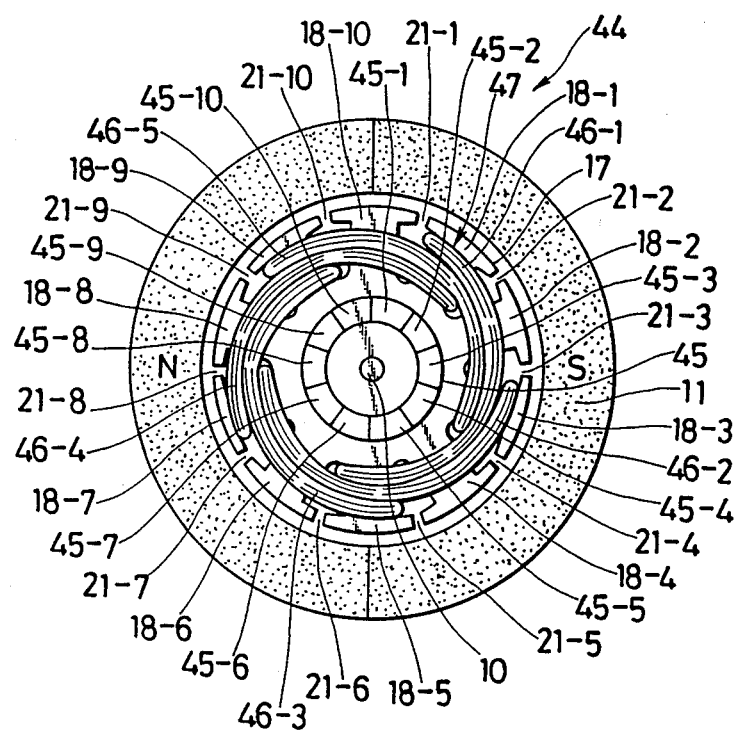
FIG. 13 is a plan view showing another conventional 5-phase dc motor with a motor body omitted.
Figure 14:
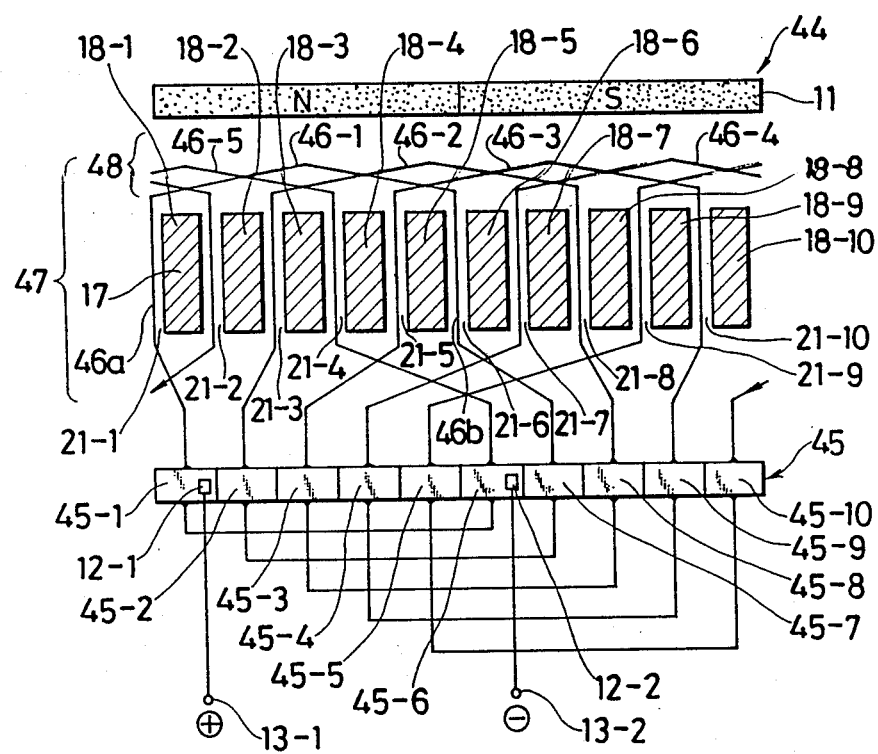
FIG. 14 is a developed view of the 5-phase dc motor of FIG. 13 illustrating a 2-pole field magnet, five armature windings for the first to the fifth phases, and a commutator including ten commutator segments.
Figure 15:
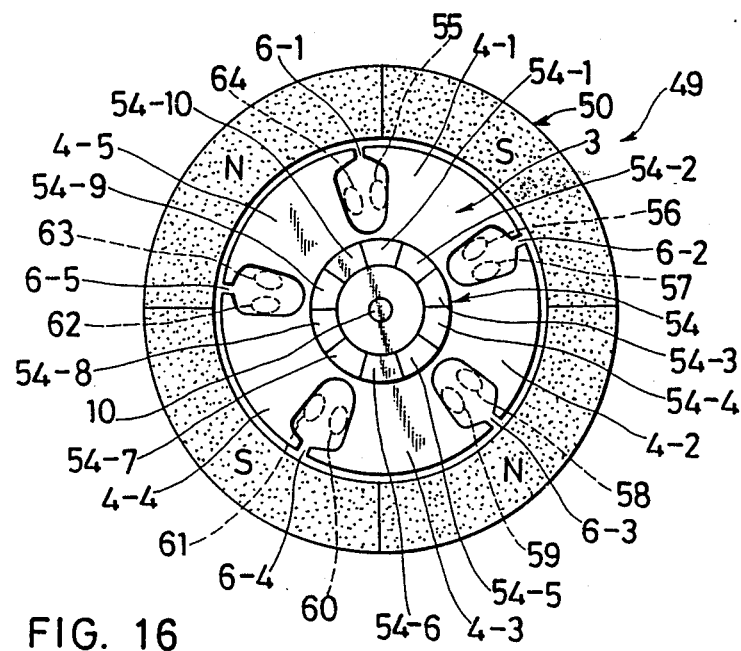
FIG. 15 is a plan view of a further conventional improved 5-phase dc motor illustrating a relationship between a rotor armature core with no armature windings wound thereon and a 4-pole field magnet serving as a stator with a motor body omitted.
Figure 16:
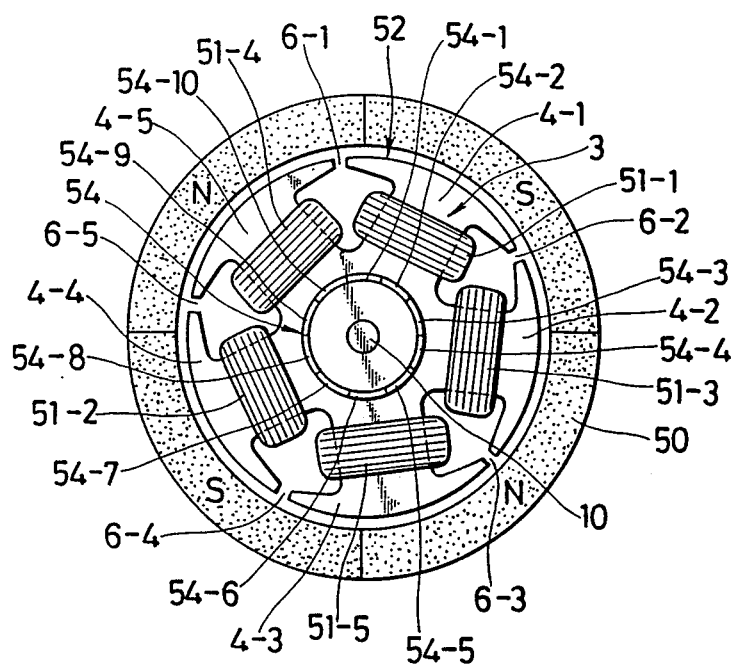
FIG. 16 is a plan view of the 5-phase dc motor of FIG. 15 with the motor body omitted.
Figure 17:
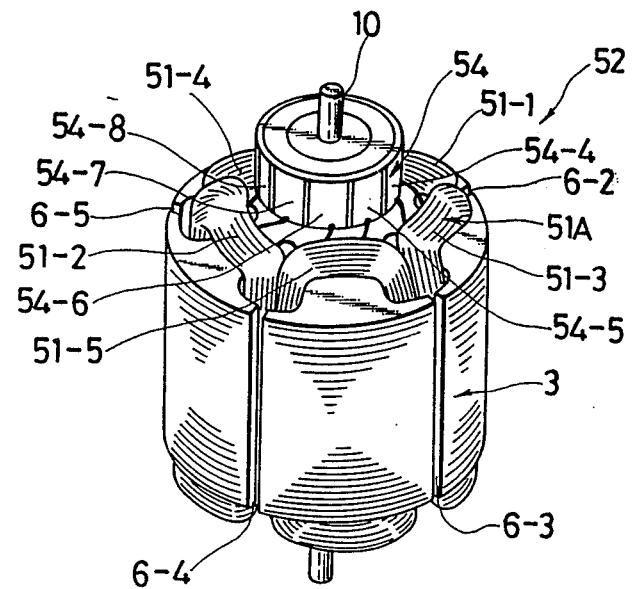
FIG. 17 is a perspective view of a rotor armature on which five armature windings for the first to the fifth phase are wound on the rotor armature core of FIG. 15.
Figure 18:
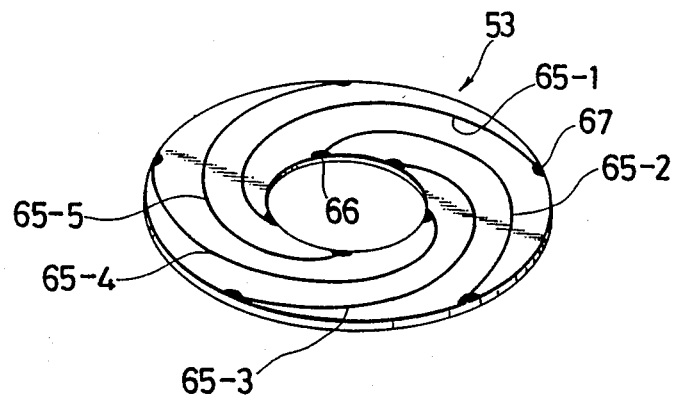
FIG. 18 is a perspective view as viewed obliquely from above showing a printed circuit board on which five printed wiring patterns to form crossover tracks are formed.
Figure 19:
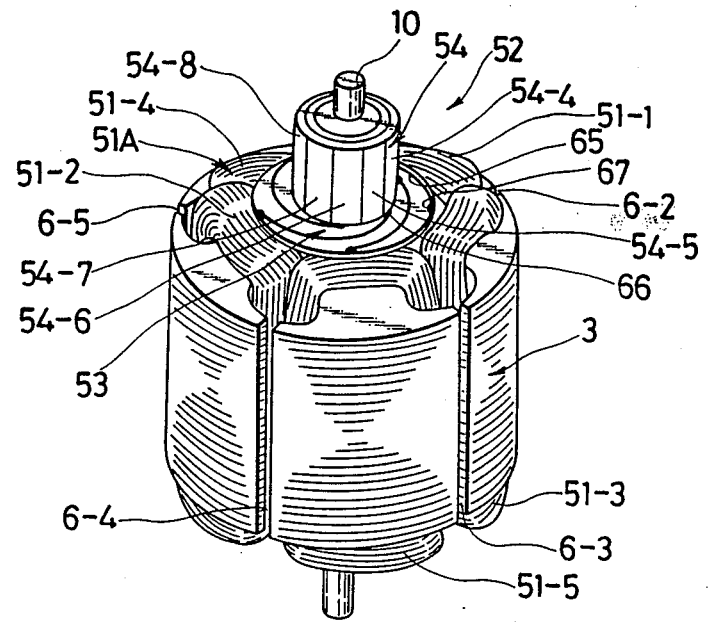
FIG. 19 is a perspective view of the rotor armature of FIG. 17 on which the printed circuit board of FIG. 18 is mounted.
Figure 20:
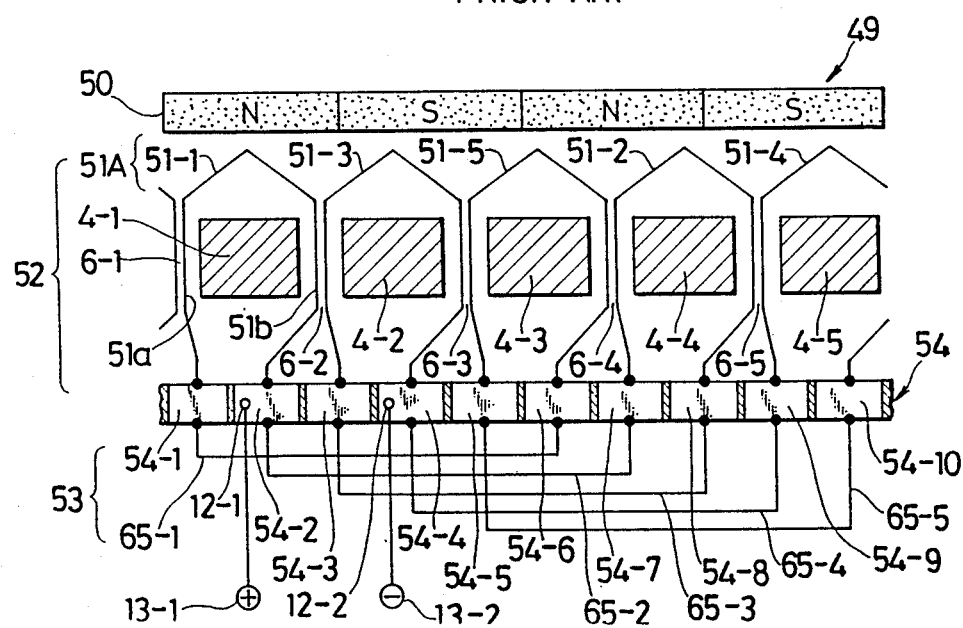
FIG. 20 is a developed view of the 4-pole field magnet, the five armature windings for the first to the fifth phases, and a commutator including ten commutator segments.

Referring to FIGS. 3 to 5, in the 5-phase dc motor 69 of the present invention, similarly as in the conventional 5-phase dc motor 49, the armature winding 70-1 for the first phase is wound on the rotor pole shoe 4-1 positioned at the position of about a•4$\pi$ (a is 0 here) radians, that is, 0° electrical (similar in mechanical angle) such that one of a pair of effective conductor portions 70a and 70b thereof which contribute to generation of torque, namely, the conductor portion 70a, is positioned at a location 73 indicated by a broken line in FIG. 3 in the slot 6-1 between the rotor pole shoes 4-5 and 4-1 while the other effective conductor portion 51b thereof is positioned at a location 74 indicated by a broken line in FIG. 3 in the slot 6-2 between the rotor pole shoes 4-1 and 4-2. The armature winding 70-3 for the third phase is wound on the rotor pole shoe 4-2 located at a position spaced by an angle of about b•4$\pi$/5 (b is 1 here) radians, that is, 144° electrical (72° mechanical) from the first rotor pole shoe 4-1 such that one 70a of a pair of effective conductor portions 70a and 70b thereof is positioned at a location 75 indicated by a broken line in the slot 6-2 between the rotor pole shoes 4-1 and 4-2 while the other effective conductor portion 70b thereof is positioned at a location 76 indicated by a broken line in the slot 6-3 between the rotor pole shoes 4-2 and 4-3. The armature winding 70-5 for the fifth phase is wound on the rotor pole shoe 4-3 located at a position spaced by an angle of about $c\bullet4\pi/5$ (c is 2 here) radians, that is, 288° electrical (144° mechanical) from the first rotor pole shoe 4-1 such that one 70a of a pair of effective conductor portions 70a and 70b thereof is positioned at a location 77 indicated by a broken line in the slot 6-3 between the rotor pole shoes 4-2 and 4-3 while the other effective conductor portion 70b thereof is positioned at a location 78 indicated by a broken line in the slot 6-4 between the rotor pole shoes 4-3 and 4-4. The armature winding 70-2 for the second phase is wound on the rotor pole shoe 4-4 located at a position spaced by an angle of about $d\bullet4\pi/5$ (d is 3 here) radians, that is, 432° electrical (216° mechanical from the first rotor pole shoe 4-1 such that one 70a of a pair of effective conductor portions 70a and 70b thereof is positioned at a location 79 indicated by a broken line in the slot 6-4 between the rotor pole shoes 4-3 and 4-4 while the other effective conductor portion 70b thereof is positioned at a location 80 indicated by a broken line in the slot 6-5 between the rotor pole shoes 4-4 and 4-5. The armature winging 70-4 for the fourth phase is wound on the rotor pole shoe 4-5 located at a position spaced by an angle of about $e\bullet4\pi/5$ (e is 4 here) radians, that is, 576° electrical (288° mechanical) from the first rotor pole shoe 4-1 such that one 70a of a pair of effective conductor portions 70a and 70b thereof is positioned at a location 81 indicated by a broken line in the slot 6-5 between the rotor pole shoes 4-4 and 4-5 while the other effective conductor portion 70b thereof is positioned at a location 82 indicated by a broken line in the slot 6-1 between the rotor pole shoes 4-5 and 4-1. In the 5-phase dc motor 69 of the present embodiment, however, there is no necessity of establishing electrical connection between commutator segments at the same phase positions by soldering using conductors or using a printed circuit board on which printed wiring patterns for providing crossover tracks are formed as particularly described herein below.

More particularly, a rotor armature 71 is constituted from the armature windings 70-1, 70-3, 70-5, 70-2 and 70-4 which are wound in a spaced relationship in phase by an angle of 144° electrical from each other on the rotor pole shoes 4-1 to 4-5, respectively, of the rotor armature core 3. As shown in FIG. 5, ones of pairs of terminals of the armature windings 70-1, 70-3, 70-5, 70-2 and 70-4 are electrically connected to commutator segments 72-1, 72-3, 72-5, 72-7 and 72-9, respectively, while the other terminals are electrically connected to the commutator segments 72-2, 72-4, 72-6, 72-8 and 72-10, respectively. Again, there is no necessity of establishing electrical connection between the commutator segments at the same phase positions by soldering using conductors or using a printed circuit board on which printed wiring patterns for providing crossover tracks are formed as particularly described hereinbelow.

In particular, as described above, the 5-phase dc motor 69 of the present invention includes a stator including the 4-pole field magnet 50, and a rotor including the rotor armature core 3 wherein the five rotor pole shoes 4-1 to 4-5 from the first to the fifth phases are formed at equal angular intervals such that the first rotor pole shoe 4-1 is formed at the position of about $a\bullet4\pi$ (a is 0 here) radians in electrical angle; the second rotor pole shoe 4-2 is formed at the position spaced by the angle of about $b\bullet4\pi/5$ (b is 1 here) radians in electrical angle from the first rotor pole shoe 4-1; the third rotor pole shoe 4-3 is formed at the position spaced by a the angle of about $c\bullet4\pi/5$ (c is 2 here) radians in electrical angle from the first rotor pole shoe 4-1; the fourth rotor pole shoe 4-4 is formed at the position spaced by the angle of about $d\bullet4\pi/5$ (d is 3 here) radians in electrical angle from the first rotor pole shoe 4-1; and the fifth rotor pole shoe 4-5 is formed at the position spaced by the angle of about $e\bullet4\pi/5$ (e is 4 here) radians in electrical angle from the first rotor pole shoe 4-1. The rotor further includes the commutator 72 composed of the ten commutator segments, namely, the first to tenth commutator segments 72-1 to 72-10 successively formed close to each other thereon. A first brush 12-1 connected to a positive power source terminal 13-1 and a second brush 12-2 connected to a negative power source terminal 13-2 are disposed in a spaced relationship by an angular distance of 90° mechanical (180° electrical) from each other and are held in sliding contact with the commutator 72.

In winding the armature windings 70-1 to 70-5, at first a lead wire (conductor) 84 for forming the one terminal for the armature winding 70-1 is brought into engagement at a portion thereof with an engaging portion 85 formed on the first commutator segment 72-1 to establish electrical connection therebetween, and then the wire 84 is wound around the first rotor pole shoe 4-1 to form the armature winding 70-1 for the first phase.

After then, a lead wire 86 which is contiguous to the wire 84 and forms the other terminal for the armature winding 70-1, is brought into engagement with an engaging portion 87 of the second commutator segment 72-2 to establish electrical connection therebetween.

A lead wire 88 engaged with the engaging portion 87 of the second commutator segment 72-2 is then introduced along a lower end face 3a of the rotor armature core 3 (refer to FIG. 2) to an engaging portion 89 of the seventh commutator segment 72-7 at the same phase position displaced in phase by an angle of $2\pi$ radians in electrical angle from the second commutator segment 72-2 to establish electrical connection therebetween. It is to be noted that, while in the embodiment the lead wire 88 extends along the lower end face 3a of the rotor armature core 3, it may otherwise extend along the other upper end face of the rotor armature core 3.

A lead wire 90 engaged with the engaging portion 89 of the seventh commutator segment 72-7 forms the one terminal for the armature winding 70-2 and is wound around the fourth rotor pole shoe 4-4 formed at the position spaced by an angle of about $d\bullet4\pi/5$ radians in electrical angle from the first rotor pole shoe 4-1 to form the armature winding 70-2 for the second phase.

Then, a lead wire 91 which is contiguous to the wire 90 and forms the other terminal for the armature winging 70-2, is introduced to an engaging portion 92 of the eighth commutator segment 72-8 to establish electrical connection therebetween. A lead wire 93 engaged with the eighth commutator segment 72-8 is then introduced along the lower end face 3a of the rotor armature core 3 to an engaging portion 94 of the third commutator segment 72-3 at the same phase position displaced in phase by an angle of $2\pi$ radians in electrical angle from the eighth commutator segment 72-8 to establish electrical connection therebetween.

A lead wire 95 engaged with the engaging portion 94 of the commutator segment 72-3 forms the one terminal for the armature winding 70-3 and is wound around the second rotor pole shoe 4-2 formed at the position spaced by an angle of about b•4π/5 radians in electrical angle from the first rotor pole shoe 4-1, whereby the armature winding 70-3 for the third phase is formed.

Then, a lead wire 96, which is contiguous to the wire 95 and forms the other terminal for the third armature winding 70-3, is introduced to an engaging portion 97 of the fourth commutator segment 72-4 to established electrical connection therebetween. A lead wire 98 engaged with the engaging portion 97 of the fourth commutator segment 72-4 is then introduced along the lower end face 3a of the rotor armature core 3 to an engaging portion 99 of the ninth commutator segment 72-9 at the same phase position displaced in phase by an angle of 2π radians in electrical angle from the fourth commutator segment 72-4 to establish electrical connection therebetween.

A lead wire 100 engaged with the engaging portion 99 of the commutator segment 72-9 forms the one terminal for the armature winding 70-4 and is wound around the fifth rotor pole shoe 4-5 formed at the position spaced by an angle of about e•4π/5 radians in electrical angle from the first rotor pole shoe 4-1, whereby the armature winding 70-4 for the fourth phase is formed. After then, a lead wire 101 which is contiguous to the wire 100 and forms the other terminal for the armature winding 70-4, is introduced to an engaging portion 102 of the tenth commutator segment 72-10 to establish electrical connection therebetween.

A lead wire 103 engaged with the engaging portion 102 of the tenth commutator segment 72-10 is then introduced along the lower end face 3l of the rotor armature core 3 to an engaging portion 104 of the fifth commutator segment 72-5 at the same phase position displaced in phase by an angle of 2π radians in electrical angle from the tenth commutator segment 72-10 to establish electrical connection therebetween. A lead wire 105 engaged with the fifth commutator segment 72-5 and forming the one terminal for the armature winding 70-5 is wound around the third rotor pole shoe 4-3 formed at the position spaced by an angle of about c•4π/5 radians in electrical angle from the first rotor pole shoe 4-1, whereby the armature winding 70-5 for the fifth phase is formed.

Then, a lead wire 106, which is contiguous to the wire 105 and forms the other terminal for the armature winding 70-5 is introduced to an engaging portion 107 formed on the sixth commutator segment 72-6 to establish electrical connection therebetween, and a lead wire 108 engaged with the engaging portion 107 is introduced along the lower end face 3a of the rotor armature core 3 to the engaging portion 85 of the first commutator segment 72-1 at the same phase position displaced in phase by an angle of 2π radians in electrical angle from the sixth commutator segment 72-6 to establish electrical connection therebetween. The rotor armature 71 is completed in this manner.

It is to be noted that while in the foregoing description the armature windings 70-1 to 70-5 and the commutator segments 72-1 to 72-10 are electrically connected in a circuit beginning with the first commutator segment 72-1, this is only for the convenience of description, and needless to say, they may be wound or electrically connected in any other order so long as similar effects can be attained. Further, while the lead wires 84, 86, 88, 90, 91, 93, 95, 96, 98, 100, 101, 103, 105, 106 and 108 are denoted by different reference numerals for the convenience of description, they are actually formed from a single continuous conductor, including the armature windings 70-1 to 70-5 too.

The electric connection and fixation of the lead wires 84, 86, 88, 90, 91, 93, 95, 96, 98, 100, 101, 103, 105, 106 and 108 to the corresponding engaging portions 85, 87, 89, 92, 94, 97, 99, 102, 104 and 107 can be established readily by a suitable method, for example, by stamping or pressing the engaging portions 85, 87, 89, 92, 94, 97, 99, 102, 104 and 107.

As apparently seen from the foregoing description, in the 5-phase dc motor 69 of the present invention, conductor end portions 83 do not overlap with any portion of the other armature windings.

What is claimed is:

1. A 5-phase dc motor, comprising a stator including a field magnet having four alternate north and south magnetic poles of an equal angular width, a rotor including a rotor armature core having five rotor pole shoes formed at equal angular intervals thereon, said rotor pole shoes including a first rotor pole shoe formed at a position of about a•4π radians in electrical angle, a being 0, a second rotor pole shoe formed at a position spaced by an angular distance of about b•4π/5 radians in electrical angle from said first rotor pole shoe, b being 1, a third rotor pole shoe formed at a position spaced by an angular distance of about c•4π/5 radians in electrical angle from said first rotor pole shoe, c being 2, a fourth rotor pole shoe formed at a position spaced by an angular distance of about d•4π/5 radians in electrical angle from said first rotor pole shoe, d being 3, and a fifth rotor pole shoe formed at a position spaced by an angular distance of about e•4π/5 radians in electrical angle from said first rotor pole shoe, e being 4, said rotor further including a commutator composed of ten commutator segments, first to tenth provided successively in an adjacent relationship on said rotor, a first brush connected to a positive power source terminal, a second brush connected to a negative power source terminal, said first and second brushes being disposed in a spaced relationship by an angular distance of 90° mechanical and for sliding contact with said commutator, and a conductor electrically connected to the first commutator segment and wound around said first rotor pole shoe to form an armature winding for the first phase, said conductor being introduced from said armature winding for the first phase to the second commutator segment to establish electric connection to the second commutator segment and further along an end face of said rotor armature core to the seventh commutator segment at the same phase position as the second commutator segment to establish electric connection to the seventh commutator segment, said conductor from the seventh commutator segment being further wound around said fourth rotor pole shoe formed at the position spaced by the angular distance of about d•4π/5 radians in electrical angle from said first rotor pole shoe to form an armature winding for the second phase, said conductor being introduced from said armature winding for the second phase to the eighth commutator segment to establish electric connection to the eighth commutator segment and further along the end face of said rotor armature core to the third commutator segment at the same phase positions as the third commutator segment to establish electric connection to the third commutator segment, said conductor from the third commutator segment being further wound around said second rotor pole shoe formed at the position spaced by the angular distance of about b•4π/5 radians in electrical angle from said first rotor pole shoe to form an armature winding for the third phase, said conductor being introduced from said armature winding for the third phase to the fourth commutator segment to establish electric connection to the fourth commutator segment and further along the end face of said rotor armature core to the ninth commutator segment at the same phase position as the fourth commutator segment to establish electric connection to the ninth commutator segment, said conductor from the ninth commutator segment being further wound around said fifth rotor pole shoe formed at the position spaced by the angular distance of about e•4π/5 radians in electrical angle from said first rotor pole shoe to form an armature winding for the fourth phase, said conductor being introduced from said armature winding for the fourth phase to the tenth commutator segment to establish electric connection to the tenth commutator segment and further along the end face of said rotor armature core to the fifth commutator segment at the same phase position as the tenth commutator segment to establish electric connection to the fifth commutator segment, said conductor from the fifth commutator segment being further wound around said third rotor pole shoe formed at the position spaced by the angular distance of about c•π/5 radians in electrical angle from said first rotor pole shoe to form an armature winding for the fifth phase, said conductor being introduced from said armature winding for the fifth phase to the sixth commutator segment to establish electric connection to the sixth commutator segment and further along the end face of said rotor armature core to the first commutator segment at the same phase position as the sixth commutator segment to establish electric connection to the first commutator segment.

2. A 5-phase dc motor as claimed in claim 1, wherein each of said commutator segments has an engaging portion at which the commutator segment is mechanically and electrically connected to said conductor.

3. A 5-phase dc motor as claimed in claim 2, wherein said conductor is mechanically secured to the engaging portions of said commutator segments by stamping the latter.

4. A 5-phase dc motor as claimed in claim 2, wherein said conductor is mechanically secured to the engaging portions of said commutator segments by pressing the latter.

* * * * *